US012583722B2

(12) United States Patent
Boustred

(10) Patent No.: US 12,583,722 B2
(45) Date of Patent: Mar. 24, 2026

(54) STABILITY SYSTEM

(71) Applicant: JCB ACCESS LIMITED, Uttoxeter (GB)

(72) Inventor: Jonathan Boustred, Uttoxeter (GB)

(73) Assignee: JCB ACCESS LIMITED, Uttoxeter (GB)

( * ) Notice: Subject to any disclaimer, the term of this patent is extended or adjusted under 35 U.S.C. 154(b) by 450 days.

(21) Appl. No.: 18/122,098

(22) Filed: Mar. 15, 2023

(65) Prior Publication Data

US 2023/0294969 A1 Sep. 21, 2023

(30) Foreign Application Priority Data

Mar. 16, 2022 (GB) ..................................... 2203609

(51) Int. Cl.

*B66F 17/00* (2006.01)
*B66F 7/08* (2006.01)
*B66F 11/04* (2006.01)

(52) U.S. Cl.

CPC .............. *B66F 17/006* (2013.01); *B66F 7/08* (2013.01); *B66F 11/042* (2013.01)

(58) Field of Classification Search

CPC ........ B66F 17/006; B66F 17/00; B66F 11/04; B66F 11/042; B66F 11/044; B66F 11/046; B66F 11/048; B66F 11/00; B66F 9/07559; B66F 7/00; B66F 7/02; B66F 7/04; B66F 7/06; B66F 7/08

(Continued)

(56) References Cited

U.S. PATENT DOCUMENTS 6,425,459 B1 7/2002 Keefer
8,267,222 B2 * 9/2012 Cui ....................... B66F 11/042 182/69.5

(Continued)

FOREIGN PATENT DOCUMENTS

GB 2 271 100 A 4/1994
KR 20200116211 A 10/2020
WO WO-2015170261 A1 * 11/2015 ............ B66F 17/006

OTHER PUBLICATIONS

Search Report issued in GB 2203609.9, dated Sep. 13, 2022.
Extended European Search Report for EP 23162165.7, mailed Aug. 8, 2023.

*Primary Examiner* — Keith J Frisby
(74) *Attorney, Agent, or Firm* — MARSHALL, GERSTEIN & BORUN LLP

(57) ABSTRACT

A stability system for inhibiting tipping of a lift vehicle. The lift vehicle includes a propulsion system and a chassis supported by a first ground engaging structure proximate a first end and a second ground engaging structure proximate a second end, as well as a platform moveable between a raised position and a lowered position. A stability system includes a first body configured to extend at least partially between the first ground engaging structure and the second ground engaging structure, wherein the first body is moveable between a deployed position enhancing the stability of the lift vehicle when the platform is in the raised position, and a stowed position when the platform is in the lowered position. When the first body is in the deployed position, the stability system produces an output indicating that a force having an upward component has been exerted on the first body.

20 Claims, 6 Drawing Sheets

(58) Field of Classification Search
USPC ............ 280/755, 763.1, 764.1, 765.1, 766.1; 182/18, 141, 69.5, 63.1, 69.6; 212/305
See application file for complete search history.

(56) References Cited

U.S. PATENT DOCUMENTS

| | | | | |
|---|---|---|---|---|
| 8,505,684 | B1 | 8/2013 | Bogue | |
| 11,148,921 | B2 * | 10/2021 | Erickson | B66F 9/24 |
| 2002/0185850 | A1 | 12/2002 | Puszkiewicz et al. | |
| 2005/0224290 | A1 * | 10/2005 | Sannah | B66F 11/042 280/775 |
| 2009/0174176 | A1 * | 7/2009 | Cui | B66F 17/003 182/69.6 |
| 2018/0022591 | A1 * | 1/2018 | Xu | B66F 9/07568 182/69.5 |
| 2018/0162708 | A1 | 6/2018 | Pithoud | |
| 2021/0276850 | A1 * | 9/2021 | Lombardo | G01G 19/08 |

* cited by examiner

STABILITY SYSTEM

FIELD

The present teachings relate to a stability system for inhibiting tipping of a lift vehicle, and a lift vehicle comprising the stability system.

BACKGROUND

Various types of working vehicle are known for use in construction, agriculture, forestry, or other industries. For example, lift vehicles such as mobile elevated work platforms (MEWPs) are a type of working vehicle which allows people to work safely at height (e.g., an elevated location). One such example of a MEWP is a scissor lift, which commonly includes a vertically moveable platform that is supported by a foldable series of linked supports.

Traditionally, working vehicles have been powered by internal combustion engines. An alternative is an electric or hybrid working vehicle which includes an electric storage device (e.g., a battery) and electrically driven actuation systems (e.g., electric traction motors for moving along a ground surface, and electrically driven actuators for moving a lift arrangement of the working vehicle).

Such electric or hybrid MEWPs include a work platform moveable between a lowered and a raised position. When the work platform is in the raised position, the lift vehicle is more likely to tilt when the ground engaging structure is driven into a depression, such as into a pothole or off a kerb, because the centre of gravity of the vehicle is higher. As the work platform supports an operator, it is even more important that stability of the lift vehicle is maintained.

Lift vehicles commonly include a pothole protection system which can be deployed when the work platform is in the raised position. The pothole protection system supports the vehicle in place of the ground engaging structure when the lift vehicle is driven into a depression. However, a problem occurs when the operator continues to drive the lift vehicle towards the depression. For example, this may increase instability of the lift vehicle, or the pothole protection system and/or the lift vehicle may become damaged from dragging along the ground.

The present teachings seek to overcome or at least mitigate one or more problems associated with the prior art.

SUMMARY

A first aspect of the teachings provides a stability system for inhibiting tipping of a lift vehicle having a chassis, the chassis being supported by a first ground engaging structure proximate a first end and a second ground engaging structure proximate a second end thereof, the chassis comprising a propulsion system for moving the lift vehicle via the ground engaging structure, and the lift vehicle comprising a platform mounted to the chassis and moveable between a raised position and a lowered position with respect to the chassis, the stability system comprising a first body mounted to the chassis and configured to extend at least partially between the first ground engaging structure and the second ground engaging structure; wherein the first body is configured to be moveable relative to the chassis between a deployed position in which the first body enhances the stability of the lift vehicle if the lift vehicle is driven into a depression when the platform is in the raised position, and a stowed position when the platform is in the lowered position; and wherein when the first body is in the deployed position, the stability system is arranged to produce an output indicating that a force having at least an upward component has been exerted on the first body.

The lowering of a body between the ground engaging structures means that if the lift vehicle is driven into a pothole or off a kerb, for example, the body supports the vehicle in place of the ground engaging structure and reduces the tilting of the vehicle and maintains stability. Advantageously, the inclusion of the output helps to prevent any further travel of the lift vehicle upon contacting the depression, for example by alerting the operator to this potentially dangerous scenario. This allows the operator to take corrective action, e.g., stopping further movement in a direction that could decrease stability and thereby enhancing safety of the operator if present on the vehicle, and to other personnel in the vicinity and helping to prevent damage to the lift vehicle.

Optionally, the output is configured to produce an indication to the operator that the force has been exerted on the first body.

The indication to the operator enables the operator to perform a corrective action to maintain stability of the lift vehicle or prevent instability from being increased.

Optionally, the force is transmitted substantially upwards through the body.

This ensures that the body can continue to support the lift vehicle when in its deployed position and may minimise the generation of stresses within the body.

Optionally, the output is configured to at least partially interrupt a transmission of drive to the ground engaging structure so as to stop or cut-out travelling of the lift vehicle along a ground surface at least in a direction towards the depression, in response to the force being exerted on the first body.

The stopping or cutting out of transmission helps to ensure that the lift vehicle is not driven further into the depression and therefore that instability is not further increased, without having to rely on the judgement of the operator.

Optionally, the stability system further comprises a detection device mounted to the chassis proximate to the first body or on the first body, wherein the detection device is configured to produce the output, optionally wherein the detection device is a sensor configured to produce the output upon the sensor being selectively triggered by the force exerted on the first body.

Known detection devices, such as sensors, can be used to detect the reaction force exerted on the first body. These sensors are relatively cheap and readily available.

Optionally, the stability system comprises a controller configured to automatically stop or control travelling of the lift vehicle along a ground surface at least in a direction towards the depression based on the output, and/or configured to indicate to the operator to stop or prevent travelling of the lift vehicle along a ground surface based on the output.

The use of a controller to automatically stop or control movement of the lift vehicle helps to ensure the stability of the lift vehicle is maintained, without relying on an input from the operator or operator judgement. The controller producing the indication may allow for a more refined system e.g., that may process signals to reduce the risk of a "false positive" or the like.

Optionally, the stability system comprises a device in communication with the controller, wherein the device is configured to indicate to the operator to stop or prevent travelling of the lift vehicle along the ground surface and/or configured to indicate to the operator that the controller has stopped or prevented travelling of the lift vehicle along the ground surface, optionally wherein the device is a display or an alarm, preferably wherein the device is at least one of an audible alarm or a visual indicator.

The device can be used to indicate to the operator that the lift vehicle is in a depression. The operator can then operate the lift vehicle accordingly, to enhance stability of the lift vehicle without damaging the stability system.

Optionally, the stability system further comprises an override mechanism, wherein the override mechanism is configured to prevent or override the output from stopping or cutting out travelling of the lift vehicle along the ground surface in at least one direction in response to the force being exerted on the first body, optionally wherein the override mechanism is configured to activate in response to an operator input.

The override mechanism enables the operator to continue operation of the lift vehicle, for example if the output has been triggered erroneously or in a situation where the safest way to restore stability is to permit driving at least in reverse and/or potentially in the same direction of travel as occurred prior to detection.

Optionally, the first body is configured to be moveable relative to the chassis of the lift vehicle in the upward direction, and wherein the first body is configured to move upon the force being exerted on the first body.

This enables the first body to move upon a surface contacting the first body so as to indicate that the lift vehicle has been driven into a depression. This is a simple way of indicating that the lift vehicle has been driven into a depression, and thus continuing to drive the lift vehicle may result in damage to the first body or increase instability.

Optionally, the movement of the first body in response to the force being exerted on the first body causes the detection device to produce the output.

When the first body moves upon contacting a ground surface, the output is produced by the detection device. This alerts the operator that the lift vehicle is in the depression, and the relevant action can be taken to prevent or control movement of the lift vehicle.

Optionally, the detection device is a position sensor, for example a proximity sensor or a limit switch, and wherein movement of the first body within a predetermined distance of the position sensor causes the position sensor to produce the output.

The position sensor can detect movement of the first body. This enables the first body to remain in contact with the ground, whilst alerting the operator to the fact that the lift vehicle is in a depression.

Optionally, the detection device includes a sensor for detecting that the force has been exerted on the first body, optionally wherein the sensor is a load sensor, a vibration sensor and/or a strain gauge.

These sensors do not require that the first body is moveable when in the deployed position. These sensors are relatively cheap and readily available.

Optionally, the stability system further comprises a deployment detection system, wherein the deployment detection system is configured to detect when the first body is in the deployed position, and/or when the first body is not in the deployed position.

The deployment detection system can detect whether the first body has been correctly deployed, and therefore whether it is safe to operate the lift vehicle.

Optionally, the detection device is used by the deployment detection system to detect whether the first body is in the deployed position and to detect when the force has been exerted on the first body.

The use of the single detection device for both detecting that the first body is in the deployed position and detecting when the lift vehicle is in a depression reduces the number of components needed to perform both functions.

Optionally, the deployment detection system includes a second detection device, and wherein the second detection device is configured to produce an output indicative that the detection device is not in the deployed position.

It may be easier to differentiate between the output that the deployment device has been correctly deployed and the output indicating that the lift vehicle is in a depression if first and second detection devices are used.

Optionally, the first body is configured to be rotatable relative to the chassis, and wherein the first body is configured to rotate so as to move between the deployed position and the stowed position.

The rotation of the first body enables the first body to compactly move between the deployed and the stowed position without obstructing other operations of the lift vehicle.

Optionally, the first body is mounted to the chassis by a mounting arrangement.

Optionally, the mounting arrangement includes at least one elongate slot configured to facilitate relative movement between the first body and the chassis, and wherein the first body is moved towards an uppermost end of the elongate slot when the force is exerted on the body.

The use of an elongate slot is a simple way of facilitating movement between the first body and the chassis, whilst utilising existing components for moving the first body between the stowed and the deployed position.

Optionally, the mounting arrangement is configured to facilitate the rotation of the first body relative to the chassis, optionally wherein the mounting arrangement comprises a linkage.

The mounting arrangement can be used to facilitate both movement of the first body relative to the chassis, and movement of the first body is indicative that the force from the lift vehicle being driven into a depression has been exerted on the first body.

Optionally, the mounting arrangement comprises an actuation mechanism configured to move the first body between the stowed position and the deployed position.

Optionally, the first body is a beam or a plate configured to extend at least partially between the first ground engaging structure and the second ground engaging structure.

A beam or plate is simple to manufacture and has a sufficient surface area to stabilise the lift vehicle whilst being compact when in the stowed position.

Optionally, the first body includes a substantially linear lowermost surface when deployed, and wherein the force is exerted on the lowermost surface of the first body.

Optionally, the force is configured to cause an upward movement of the body.

Optionally, the first body is configured to move into the deployed position automatically when the platform is raised, and configured to move into the stowed position automatically when the platform is lowered.

This helps to ensure that the first body is in the deployed position when the platform is raised, thus improving safety of the lift vehicle. The deployment being automatic negates the need to rely on the operator to deploy the first body, thus further improving safety of the lift vehicle.

Optionally, the stability system comprises a second body configured to be located on an opposing side of a central longitudinal axis of the lift vehicle to the first body, wherein the second body has a deployed position and a stowed position, optionally wherein the second body is a plate or a beam.

The first body enhances stability when the lift vehicle is tipping in a first direction, and the second body enhances stability when the lift vehicle is tipping in a second direction opposing the first direction. As such, the overall stability of the lift vehicle is enhanced from the inclusion of both a first and second body.

A further aspect of the teachings provides a lift vehicle comprising a chassis; a first ground engaging structure proximate a first end of the chassis and a second ground engaging structure proximate a second end of the chassis; wherein the chassis is supported by the first and second ground engaging structures; wherein the chassis comprises a propulsion system for moving the lift vehicle via the ground engaging structure and the lift vehicle comprises a platform mounted to the chassis and moveable between a raised position and a lowered position with respect to the chassis; and the stability system according to first aspect.

BRIEF DESCRIPTION OF THE DRAWINGS

Embodiments will now be described with reference to the accompanying drawings, in which.

DETAILED DESCRIPTION

Figure 1:
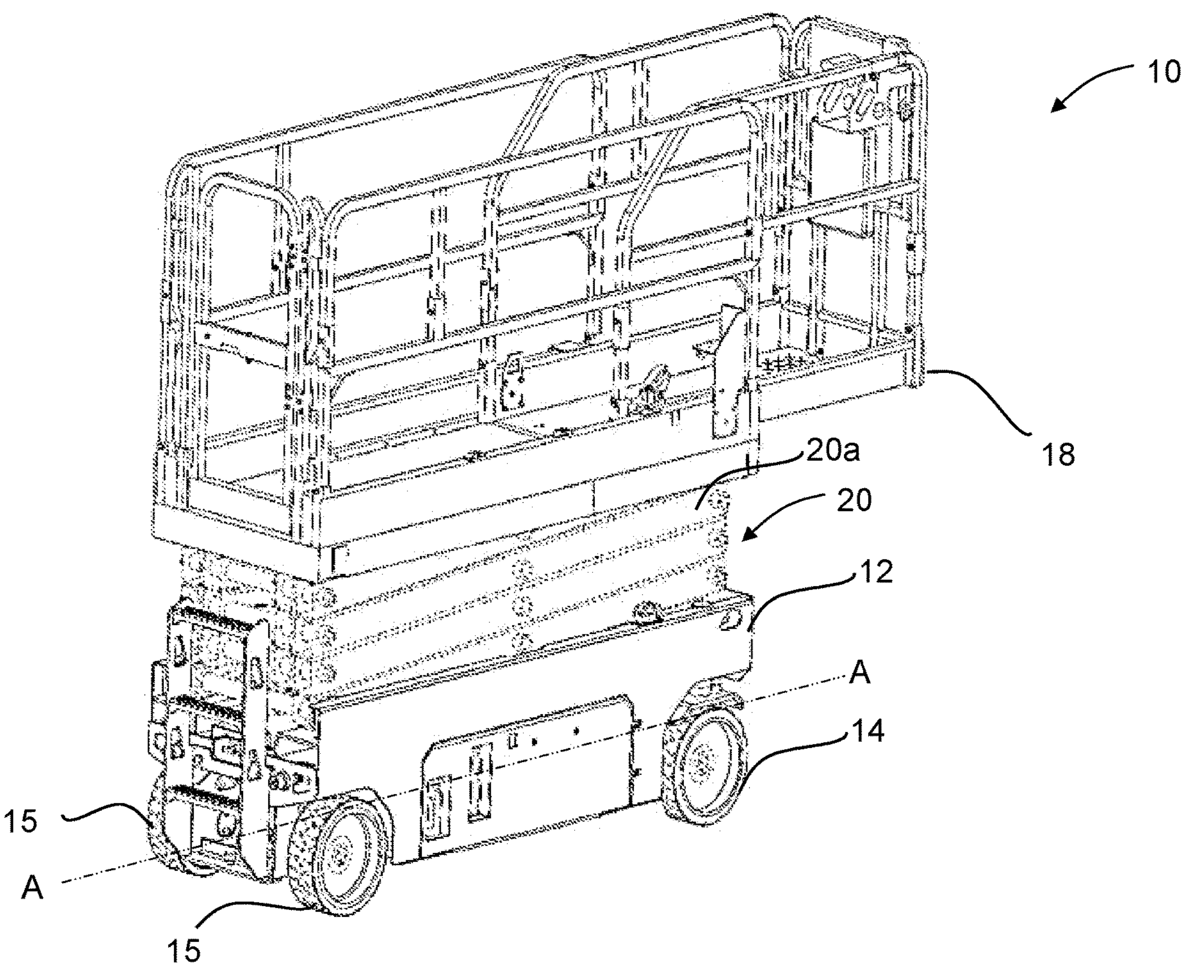
FIG. 1 is an isometric view of a lift vehicle according to an embodiment of the present invention.

Referring firstly to FIG. 1, a lift vehicle is indicated generally at 10. In the illustrated embodiment, the lift vehicle 10 is a scissor lift vehicle 10. In alternative embodiments, the lift vehicle 10 is a different type of lift vehicle, e.g., a lift vehicle with a work platform attached to a vertically telescoping mast, or to a pivotally mounted arm or the like.

Figure 2:
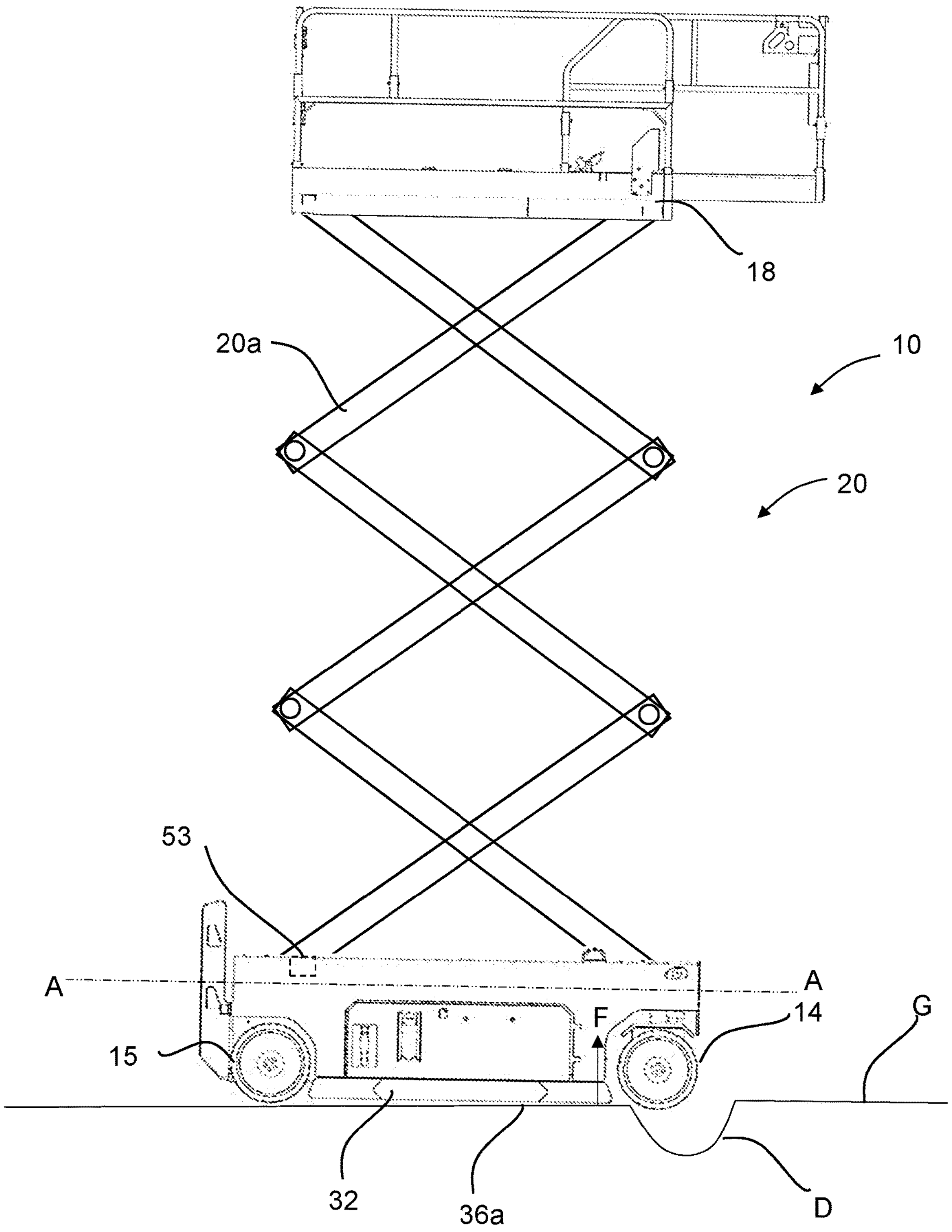
FIG. 2 is a side view of the lift vehicle of FIG. 1 being driven into a depression.

The lift vehicle 10 includes a chassis 12 with a driving arrangement for moving the lift vehicle 10 on a ground surface G, and a stability system 30 according to an embodiment of the present teachings. The stability system 30 enhances the stability of the lift vehicle 10 when the lift vehicle 10 is driven into a depression D, as illustrated in FIG. 2. In the illustrated embodiment, the driving arrangement includes a first ground engaging structure 14 proximate a first end of the chassis 12, and a second ground engaging structure 15 proximate a second end of the chassis 12. The chassis 12 is supported by the first and second ground engaging structures 14, 15. In this embodiment, the first and second ground engaging structures 14, 15 are in the form of a plurality of wheels 14, 15 (e.g., four wheels 14, 15). In alternative embodiments, the ground engaging structure has more or less than four wheels or has tracks instead of wheels.

The chassis 12 includes a propulsion system (not shown) for moving the lift vehicle 12 along the ground surface G via the first and second ground engaging structures 14, 15.

The lift vehicle 10 includes a platform 18 mounted to the chassis 12 and moveable between a raised position and a lowered position with respect to the chassis. It shall be appreciated that the raised position refers to any position of the platform 18 beyond the lowered position in a lifting direction, for example the position of the platform 18 illustrated in FIG. 2.

In this embodiment, the work platform 18 follows a generally vertical linear path when moving between the raised position of FIG. 2 and lowered position of FIG. 1. In alternative embodiments, for example when the platform 18 is mounted to an end of a working arm, the platform 18 may be free to move in any direction, and may follow a non-linear path.

The platform 18 is designed for receiving one or more people and/or objects (not shown). The lift vehicle 10 is configured for moving the people and/or objects in the work platform 18, via actuation of the platform 18, to a location remote from the ground surface G (e.g., the raised position).

In this embodiment, the platform 18 is raised and lowered via a scissor arrangement 20. The scissor arrangement 20 supports the platform 18 at a first end and is coupled to the chassis 12 at a second end. The scissor arrangement 20 includes a plurality of foldable linked supports 20*a* which overlap one another in pairs so as to form a conventional “X” pattern. Each of the pairs of linked supports 20*a* are connected at a pivot point such that the linked supports 20*a* can rotate with respect to each other in order to move the platform 18 between the raised and lowered positions as is known in the art.

In this embodiment there are three pairs of overlapping linked supports arranged in series and connected to one another. In alternative embodiments, there may be any suitable number of linked supports depending on the height requirements of the lift vehicle 10. There is a substantially identical arrangement of foldable linked supports 20*a* on opposing sides of the chassis 12.

The scissor arrangement 20 is moveable between a multiplicity of raised positions and the lowered position by an actuator (not shown), for example a linear actuator, as is known in the art. In this embodiment, the actuator is an electric actuator, however in alternative embodiments, the actuator may be, for example, a hydraulic actuator.

A platform 18 raise/lower sensor (illustrated schematically at 53) is provided to detect lifting of the platform and may be in the form of a limit switch, pressure sensor, Hall effect sensor or the like. In this embodiment, the sensor 53 is a limit switch that is closed when the platform 18 is lowered and open when the platform is raised.

In alternative embodiments, the lift vehicle 10 may include an articulated boom for raising the overall height of the boom, and the platform 18 may be coupled to an end of the boom.

The lift vehicle 10 is an electric or hybrid lift vehicle having an electric storage device (not shown) as a source of power. It shall be appreciated that the stability system 30 is also suitable for use with a lift vehicle 10 powered by an alternative source of power, for example an internal combustion engine, and with alternative transmissions (e.g. hydraulic or mechanical). The lift vehicle 10 also includes one or more traction motors 56 (FIG. 6) having a driving state, in which the traction motor is configured to propel the lift vehicle 10 using power from the electric storage device (i.e., by driving the wheels 14, 15). The electric storage device and the traction motor 56 may be mounted at any suitable location on the chassis 12. The electric storage device is also used to power the electric actuator, and therefore to move the platform 18 between the raised and lowered position.

Figure 3:
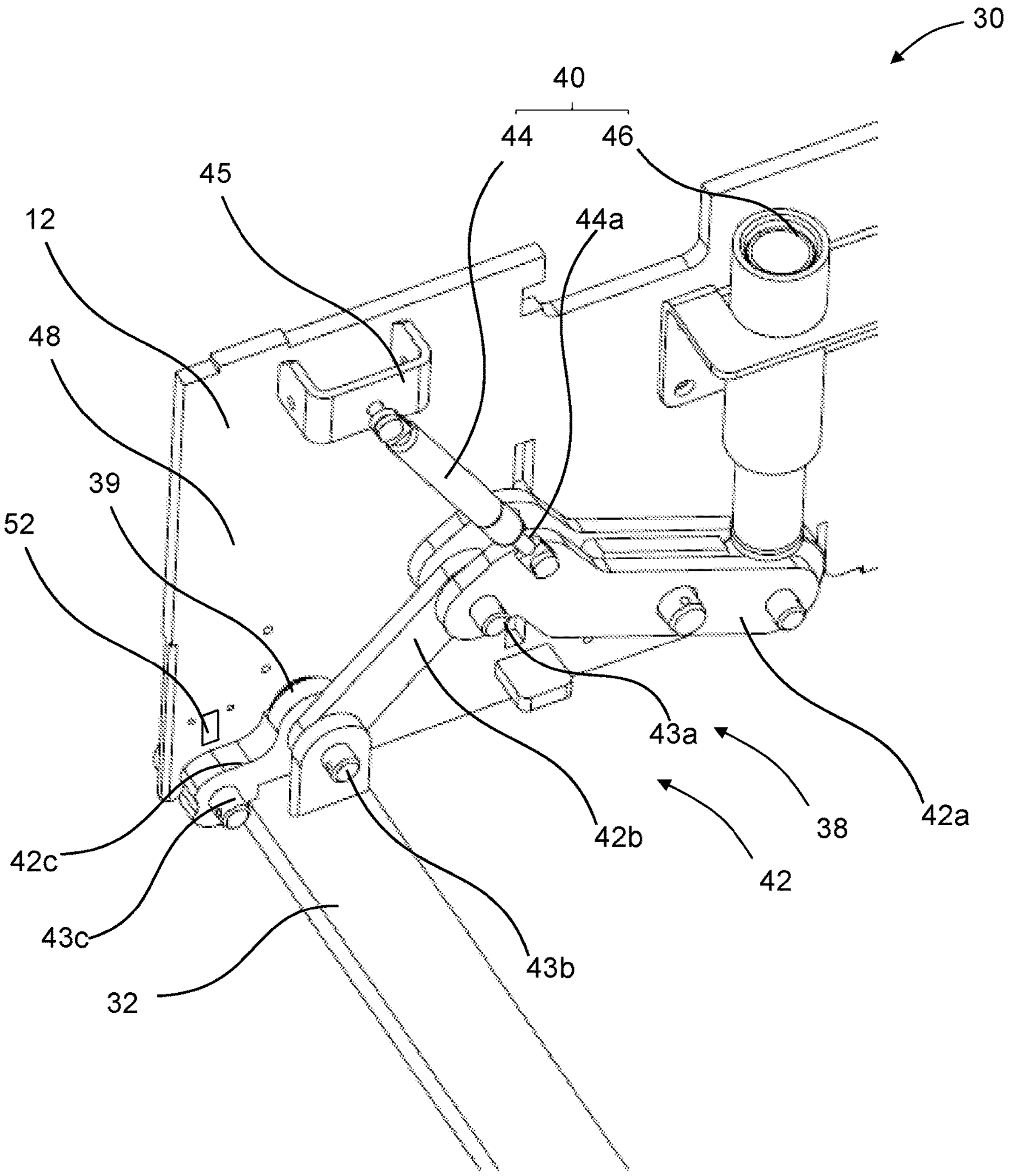
FIG. 3 is an isometric view of a stability system of the lift vehicle of FIG. 1 in the stowed position.
Figure 4:
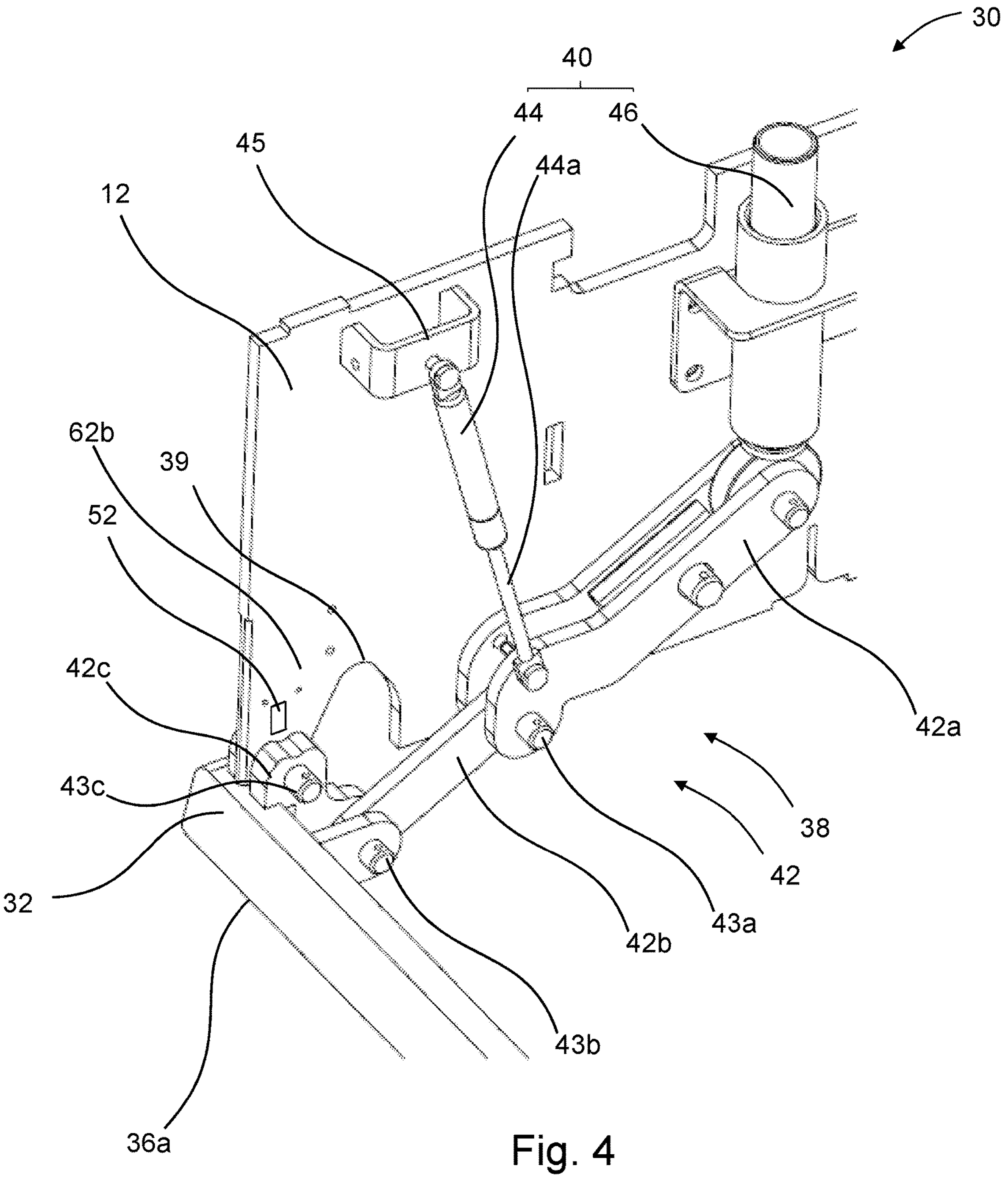
FIG. 4 is an isometric view of a stability system of the lift vehicle of FIG. 1 in the deployed position.

Referring to FIGS. 3 and 4, the stability system 30 of the lift vehicle 10 is illustrated. The stability system 30 includes a first body 32 mounted to the chassis 12 and configured to extend at least partially between the first ground engaging structure 14 and the second ground engaging structure 15, and a mounting arrangement 38. The first body 32 is configured to be moveable relative to the chassis 12 between a deployed position (illustrated in FIG. 4) in which the first body 12 enhances the stability of the lift vehicle 10 if the lift vehicle 10 is driven into the depression D, and a stowed position (illustrated in FIG. 3). The first body 32 is moved into the lowered position when the platform 18 is in the raised positions, and hence the instability of the lift vehicle increases, and the first body 32 is moved into the stowed position when the platform 18 is in the lowered position.

It shall be appreciated that in this embodiment, the first body 32 is located towards an outermost side of the chassis 12, however in alternative embodiments, the first body 32 may be mounted at any suitable location of the chassis 12.

The stability system 30 of this embodiment includes a second body (not shown) of substantially the same configuration as the first body 32. It shall be appreciated that in alternative embodiments, the second body may be omitted. The second body is located on an opposing side of a central longitudinal axis A-A of the lift vehicle 10 to the first body 32. In this embodiment, the second body is located towards the opposing outermost side of the chassis 12. For reasons of conciseness and brevity, only the first body 32 will be described hereafter.

The first body 32 is generally formed from steel, however any suitable material may be used. A height of the first body 32 and a ground clearance are selected such that if the ground engaging structure drives into the depression D, the first body 32 will prevent the chassis 12 from tilting beyond a predetermined angle of tilt. The predetermined angle of tilt is a perceived 'safe limit' where there is a minimal risk of the lift vehicle 10 tipping even if the platform 18 is fully raised.

The first body 32 is configured to rotate relative to the chassis 12 so as to move between the deployed position and the stowed position. In this embodiment, the first body is a beam 32 or plate (commonly referred to as a pothole protection plate). In alternative embodiments, the first body 32 may be any suitable shape. The first body 32 includes a substantially planar lowermost surface 36*a*. It shall be appreciated that the term "lowermost" in this instance refers to the position of the surface 36*a* when the first body 32 is in the deployed position. The lowermost surface 36*a* contacts the ground surface G when the lift vehicle 10 is driven into the depression D.

The first body 32 is mounted to the chassis 12 by a mounting arrangement 38. The chassis 12 includes a recess 39 for receiving the first body 32 in the stowed position. In this embodiment, the mounting arrangement 38 includes an actuation mechanism 40 and a linkage 42. The actuation mechanism 40 is coupled to the linkage 42 such that the actuation mechanism 40 actuates the linkage 42. It shall be appreciated that in alternative embodiments, any suitable mounting arrangement may be used to moveably mount the first body 32 to the chassis 12.

The actuation mechanism 40 includes a gas strut 44 and an actuator 46 in the form of a plunger. The actuation mechanism 40 is mounted to a surface 48 of the chassis 12 which is perpendicular to the longitudinal axis A-A of the chassis 12. The gas strut 44 is coupled to the chassis 12 at a first end, and to the linkage 42 at a second end.

The first body 32 is configured to move into the deployed position automatically when the platform 18 is raised and configured to move into the stowed position automatically when the platform 18 is lowered. In this embodiment, it is the plunger 46 that facilitates the automatic deployment of the first body 32 in conjunction with the gas strut 44. It shall be appreciated that in alternative embodiments, the first body 32 may be deployed by a controller, for example when the platform 18 has been raised above a predetermined distance.

The plunger 46 is slidably mounted to the chassis 12 and is arranged to be depressed by the scissor arrangement 20 in its lowered state. Accordingly, when the platform 18 is moved into the raised position, the plunger 46 is able to move in a generally upward direction, as illustrated in FIG. 4. In this embodiment, where the lift vehicle 10 is a scissor lift, the upward direction is substantially the same as a raising direction of the platform 18.

The linkage 42 includes a lever 42*a*, a link 42*b* and the first body 32 which incorporates a pivoting arm 42*c*. The pivoting arm 42*c* is fixed relative to the first body 32. The lever 42 is pivotably connected to the link 42*b* via a first pivot pin 43*a*. The link 42*b* is pivotably connected to the pivotable arm 42*c* of the first body 32 via a second pivot pin 43*b*. The pivotable arm 42*c* is pivotably connected to the chassis 12 via a third pivot pin 43*c*. The lever 42*a* is pivotably mounted to the chassis 12 intermediate its ends to form two arms, the first arm being driven by the plunger 46.

The second arm of the lever 42*a* is connected to the gas strut 44. The gas strut 44 biases the lever 42*a* into the deployed position, as illustrated in FIG. 4, where a rod 44*a* of the gas strut 44 is in an extended position. When the plunger 46 is no longer constrained by the scissor arrangement 20, the gas strut 44 extends and deploys the body 32 via the link 42*b* to pivot into the lowered position of FIG. 4.

It shall be appreciated that in alternative embodiments, any suitable mechanism may be used to bias the lever 42*a* into the stowed position, for example a spring.

In alternative embodiments, the first body 32 may be rotated at any suitable angle to move between the deployed and the stowed position. Alternatively, the movement of the first body 32 between the stowed and deployed positions may be substantially linear.

In order to rotate the first body 32 from the deployed position into the stowed position, the platform 18 is lowered which causes the plunger 46 to move in a generally downward direction when contacted by the scissor arrangement 20. The rod 44*a* of the gas strut 44 is forced to retract and the linkage operates in reverse.

It shall be appreciated that in alternative embodiments, the linkage 42 may be arranged in any suitable configuration, and any number of links may be used. Alternatively, the linkage 42 may be omitted and any suitable arrangement may be used to move the first body 32 into the deployed position.

In this embodiment, when the first body 32 is in the deployed position, the first body 32 is configured to be moveable relative to the chassis 12 of the lift vehicle 10 in a substantially upward direction for reasons described in more detail below. It shall be appreciated that the term "upward" refers to a direction substantially perpendicular to the ground surface G. Upward movement is distinct from pivoting movement. In other words, upward movement is a translation of the first body 32 in an upward direction, rather than a pivoting motion that only allows a lower edge of the body to be raised.

Figure 5A:
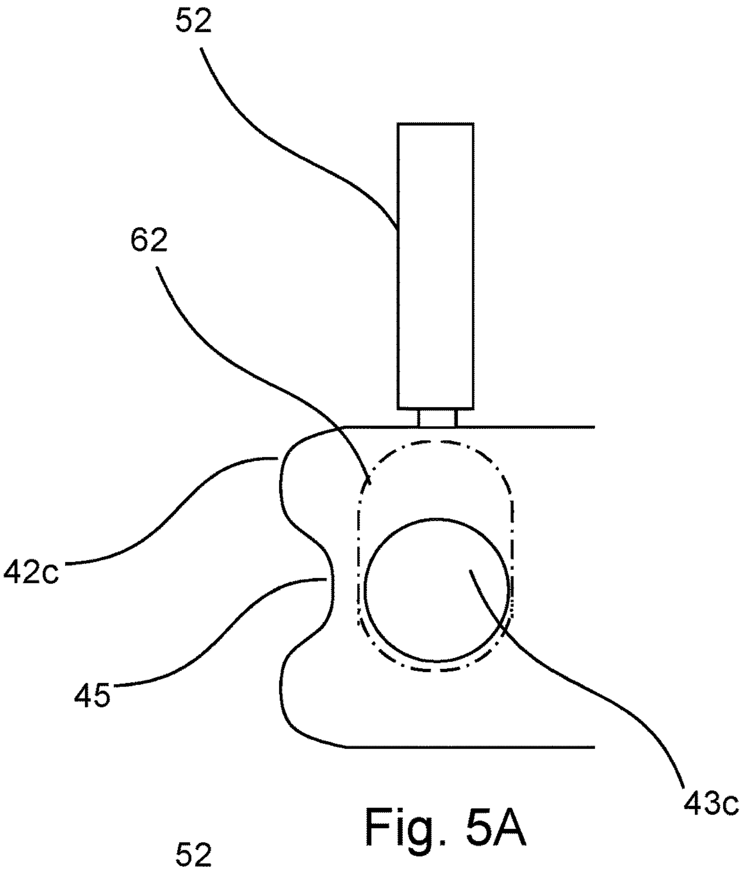
FIGS. 5A, 5B and 5C are cross-sectional views of a portion of the stability system of FIGS. 3 and 4 in the deployed and stowed positions.
Figure 5B:
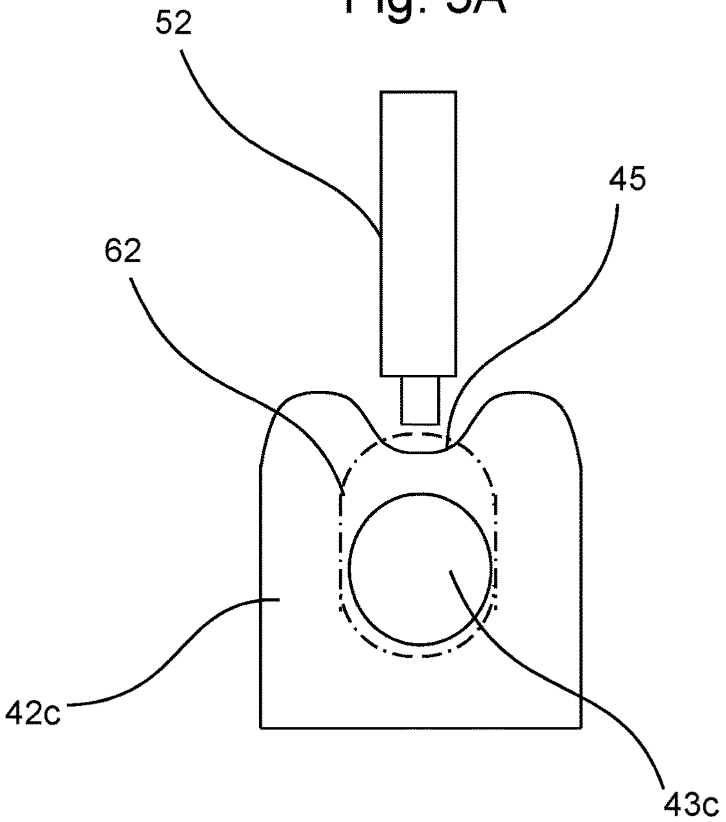
Figure 5C:
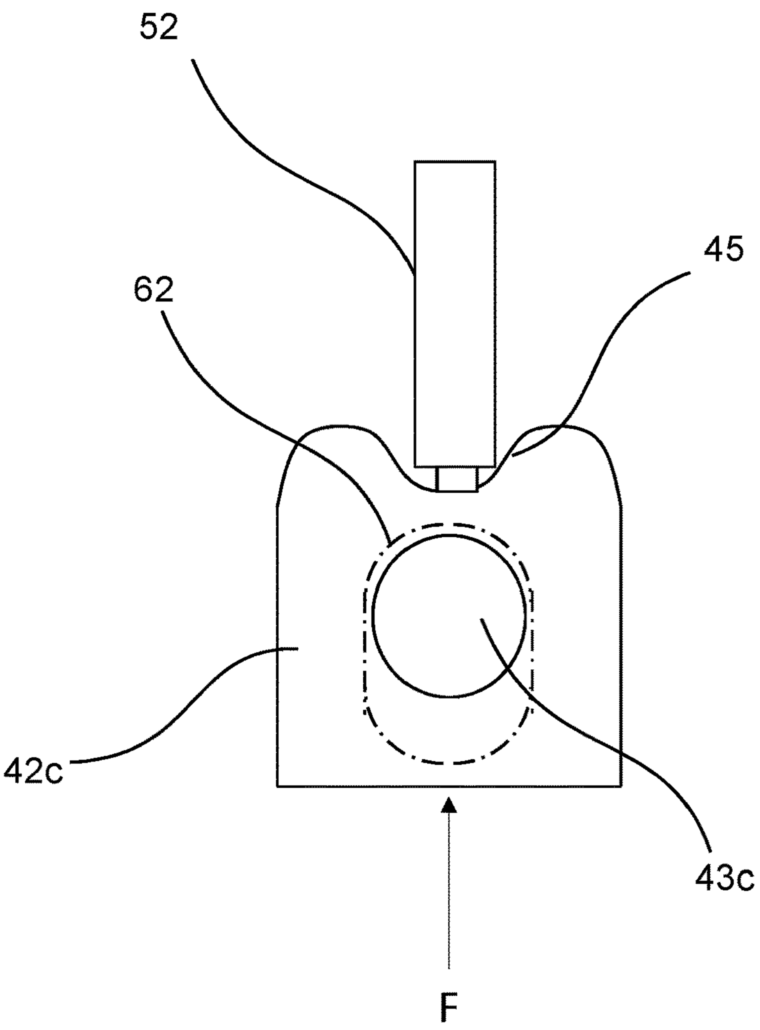

In order to facilitate the relative movement in the upward direction between the first body 32 and the chassis 12, the mounting arrangement 38 includes a least one elongate slot 62, as illustrated in FIGS. 5A-C. In this embodiment, the mounting arrangement 38 includes one elongate slot 62 for facilitating relative upward movement between the pivoting arm 42*c* of the first body 32 and the chassis 12. This enables the first body 32 to move relative to the chassis 12 by a predetermined distance defined by a length of the elongate slot 62. The length of the elongate slot 62 may vary based on the dimensions of lift vehicle 10 and/or of an associated detection device (see below), however in this embodiment the elongate slot has an amount of free vertical play in the range 2 mm to 20 mm, preferably in the range 5 mm to 10 mm.

The elongate slot 62 is located on the chassis 12. The elongate slot 62 receives the third pivot pin 43*c* of the pivotable arm 42*c*. The third pivot pin 43*c* is moveable between an uppermost end and a lowermost end of the elongate slot 62. It shall be appreciated that in alternative embodiments, the elongate slot 62 may receive any suitable component of the linkage 42 or mounting arrangement 38 depending on the design of the linkage or mounting arrangement.

It shall be appreciated that in alternative embodiments, any suitable arrangement of elongate slot or slots may be used to facilitate relative upward movement between the first body 32 and the chassis 12. Any number of elongate slots may be used, for example depending on the design of the linkage and number of links connected to the first body 32.

In alternative embodiments, the elongate slots may be omitted, and any suitable arrangement may be used to facilitate the relative upward movement between the first body 32 and the chassis 12.

In this embodiment, the stability system 30 also includes a deployment detection system 50. The deployment detection system 50 is configured to detect when the first body 32 is in the deployed position and/or when the first body is not in the deployed position. The deployment detection system 50 produces an output indicative of whether the first body 32 is in the deployed position. This helps to improve safety, because the output can be used to inform the operator that the first body 32 has not been correctly deployed, and therefore that it is not safe to move the lift vehicle 10 along the ground surface G.

The output of the deployment detection system 50 may be configured to interrupt transmission of drive to the ground engaging structure 14, 15 so as to stop or cut-out travelling of the lift vehicle 10 along the ground surface G when it is detected that the platform 18 is in the raised position and the first body 32 has not been correctly deployed. Alternatively, or additionally, a device (not shown) may be used to communicate to the operator that the first body 32 has not been correctly deployed, enabling the operator to take corrective action.

The deployment detection system 50 includes a detection device 52 for detecting whether the first body 32 is in the deployed position. In this embodiment, the detection device 52 is a limit switch 52. However, in alternative embodiments, any suitable detective device 52 may be used, for example an alternative type of sensor, such as a Hall effect or proximity sensor. Although only one such device 52 is shown in FIGS. 3 and 4, in this embodiment four devices 52 are provided, one at each end the first body 32, and one at each end of the second functionally identical body (not shown) on the opposite side of the lift vehicle 10.

The limit switch 52 is located on the chassis 12. The limit switch 52 is located a predetermined distance above the elongate slot 62. The limit switch 52 is located on the surface 48 of the chassis 12, and is selectively triggered by movement of the first body 32.

FIGS. 5A and 5B illustrate the positions of the pivotable arm 42*c* used by the deployment detection system 50 to determine whether the first body 32 has been correctly deployed. As described above, as the first body 32 is moved between the stowed and the deployed positions, the pivotable arm 42*c* rotates relative to the chassis 12. The pivotable arm 42*c* includes a cam profile 45 which rotates as the first body 32 is deployed and varies a distance between the limit switch 52 and the surface of the cam profile 45.

As illustrated in FIG. 5A, the limit switch 52 is positioned on the chassis 12 such that when the pivotable arm 42*c* is in the stowed position or at an angle intermediate the stowed and deployed positions, the cam profile 45 moves within a predetermined distance of the limit switch 52 and selectively triggers the limit switch 52, for example, by depressing the limit switch 52 so it is “closed” and produces a high output.

As illustrated in FIG. 5B, when the pivotable arm 42*c* is rotated from the stowed position and has reached the deployed position, the cam profile 45 is clear of the limit switch 52 and the limit switch is “open” and produces a low output.

In other embodiments it will be appreciated that the high and low outputs may be reversed as required.

When the first body 32 is in the deployed position, the stability system 30 is further configured to produce a “closed” output that indicates that a force F having at least an upward component has been exerted on the first body 32. FIGS. 2 and 5C illustrate the operation of the stability system 30 of this embodiment when the upward force F has been exerted on the first body 32.

As illustrated in FIG. 5C, when the force F is exerted on the first body 32, the third pivot pin 43*c* is moved to the uppermost end of the elongate slot 62. The length of the elongate slot 62 is greater than the deviation in the cam profile 45, thus causing the limit switch 52 to close.

The upward force F is indicative that the lift vehicle 10 has been driven into the depression D, and therefore that the ground surface has exerted the upward force F on the first body 32.

Figure 6:
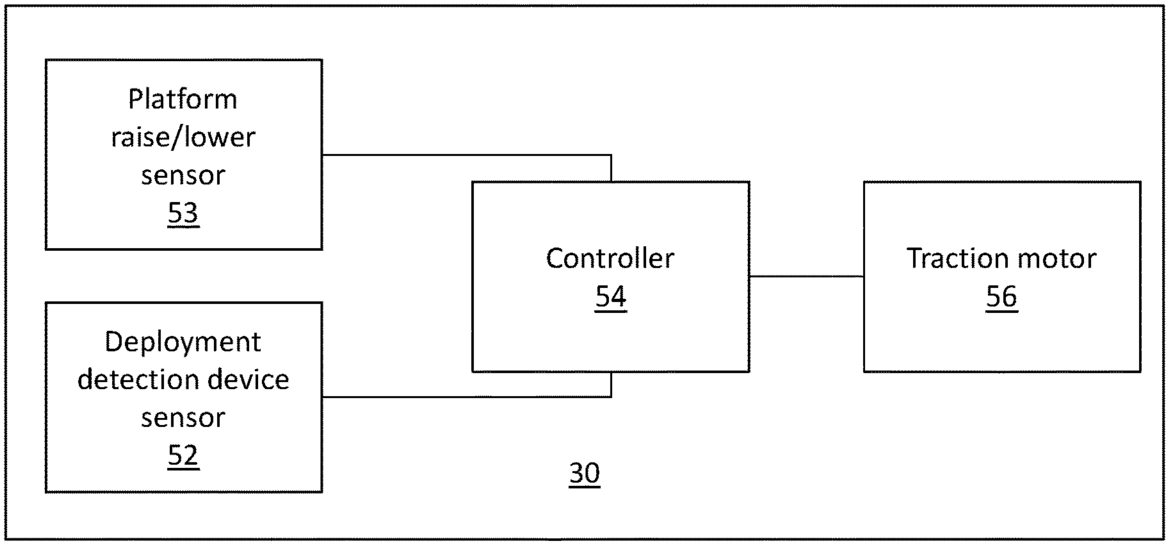
FIG. 6 is a schematic diagram of a control system of the lift vehicle.

With reference to FIG. 6, the electrical aspects of the stability system 30 are illustrated schematically and comprise a controller 54 (e.g., a suitable microprocessor or logic circuit) that determines if drive of the traction motor 56 is permitted based on the outputs from the limit switch 52 and the platform raise/lower sensor 53. The controller 54 provides a suitable output signal to the traction motor.

The logic of the controller 54 is summarised in the table below:

| Detection device limit switch 52 output | Platform raise/lower sensor 53 output (closed = lowered, raised = open) | Traction motor drive allowed? |
|---|---|---|
| Closed (body 32 not deployed because platform not raised) | Closed | Yes |
| Closed (either due to body 32 not deployed or | Open | No |

-continued

| Detection device limit switch 52 output | Platform raise/lower sensor 53 output (closed = lowered, raised = open) | Traction motor drive allowed? |
|---|---|---|
| upward force F when body 32 deployed) Open | Open | Yes |

The closed/closed condition corresponds to operation with the platform 18 lowered with the stability system 30 not deployed, which is permitted due to the low risk of instability due to the lower centre of gravity. The closed/open condition corresponds to one of two situations: either failed deployment of the stability system when the platform 18 is raised, or to the detection of the force F as a result of driving into a depression, in neither of which is traction motor drive permitted for safety reasons. The open/open condition corresponds to the platform 18 being raised and the stability system 30 being deployed without the force F being detected.

Thus, via the provision of the slot 62 an additional safety function is provided without requiring additional sensors or other components, compared to known stability systems Advantageously, the additional safety function of cutting drive when detecting the force F prevents the operator from driving the lift vehicle 10 further into the depression D, resulting in the potential for greater instability. In this embodiment, to correct the situation, the operator needs to lower the platform 18 to re-enable drive and allow the vehicle to be reversed out of the depression D.

It shall be appreciated that in alternative embodiments, the detection device 52, the controller 54 may be omitted and any suitable mechanism may be used to produce the output mechanically, as will be described in more detail below.

The controller may be further configured to provide an audible and/or visual warning of the potentially unsafe condition.

The controller may also be configured to automatically stop or control travelling of the lift vehicle 10 along the ground surface G or indicate to the operator to stop or prevent travelling of the lift vehicle 10 along the ground surface G only when it is determined that the upward force F has been exerted on the first body 32 for a predetermined time. For example, the predetermined time may be 0.5s. This may help to prevent the output being produced when the first body 32 has been erroneously triggered, for example by an obstacle or vibration rather than the lift vehicle 10 being driven into the depression D.

The detection device 52 is mounted to the chassis 12 proximate the first body 32. In alternative embodiments, the detection device may be mounted on the first body 32. For example, the detection device may be a strain gauge provided on the first body.

It shall be appreciated that in alternative embodiments, particularly with an alternative mounting arrangement, any suitable component may trigger the limit switch 52 upon the upward force F being exerted on the first body 32.

The device is used to indicate to the operator to stop or prevent movement of the lift vehicle 10, or to indicate that the controller has automatically stopped or prevented movement of the lift vehicle 10 along the ground surface G. In this embodiment, the device is the same as the device used by the deployment detection system to indicate whether the first body 32 has been correctly deployed. In alternative embodiments, separate devices may be used, or the device may issue different audio and/or visual indications for the two conditions.

The stability system 30 may in some embodiments stop or prevent movement in any direction. In other embodiments the stability system 30 may store the direction of travel of the lift vehicle and prevent further movement in the direction of travel only when force F is detected, but permit movement in the reverse direction. The movement in the reverse direction may be limited to a certain time period or certain distance (e.g. 5 seconds or 5 meters).

The stability system 30 may also include an override mechanism (not shown). The override mechanism is configured to prevent the output from stopping or cutting out travelling of the lift vehicle 10 along the ground surface in at least one direction in response to the force F being exerted on the first body 32. The override mechanism may be configured to activate in response to an operator input, for example actuation of a button or switch.

For example, it is conceivable that corrective action to drive the lift vehicle 10 out of the depression D may involve further travelling of the lift vehicle 10 along the ground surface G in the direction towards the depression D. If the transmission of drive has been cut-out in this direction, it may be advantageous to include the override mechanism to enable the operator to perform the corrective action. Additionally, if the stability system 30 has cut-out drive in a direction away from the depression D, for example in the reverse direction, the override mechanism may activate to enable the operator to move the lift vehicle 10 in this direction.

It shall be appreciated that in alternative embodiments, the deployment detection system 50 may include a second detection device, and the second detection device may be configured to produce the output indicative that the first body 32 is not in the deployed position, as opposed to the detection device 52. This may be particularly advantageous when the detection device 52 is not a position sensor, which will be described in more detail below.

In a further alternative embodiment, the controller 58 may be omitted to simplify the stability system 30. For example, upward movement of the first body 32 may complete or interrupt a circuit, and this may produce an output. The output can directly produce an indication to the operator that the force F has been exerted on the first body 32, and/or at least partially interrupt the transmission of drive to the ground engaging structure 14, 15. Movement of the first body 32 may, for example, complete a circuit which activates a light emitting device, or activates an audible device. It shall be appreciated that such a system may also be used in conjunction with a controller in a more complex embodiment.

In a further alternative embodiment, when the first body 32 is in the deployed position, the position of the first body 32 is fixed in the upward direction relative to chassis 12. For example, the elongate slot may be replaced with a standard bore. In this embodiment, the detection device may be mounted to the first body 32 as opposed to the chassis 12. The detection device of this embodiment may be any suitable device for detecting that the upward force F has been exerted on the first body 32 or for detecting a parameter indicative that the upward force F has been exerted on the first body 32. For example, a load sensor, a vibration sensor and/or a strain gauge may be used to produce the output.

In this embodiment, it may be beneficial for the detection device used to indicate that the upward force F has been exerted on the body to be separate to the detection device used by the deployment detection system. Alternatively, the detection device mounted to the first body may also be used to detect, for example, when a force is exerted on the first body 32 by the chassis 12 indicative that the first body 32 is in the stowed position.

Although the teachings have been described above with reference to one or more preferred embodiments, it will be appreciated that various changes or modifications may be made without departing from the scope as defined in the appended claims.

The invention claimed is:

1. A stability system for inhibiting tipping of a lift vehicle having a chassis, the chassis being supported by a first ground engaging structure proximate a first end and a second ground engaging structure proximate a second end thereof, the chassis comprising a propulsion system for moving the lift vehicle via the ground engaging structure, and the lift vehicle comprising a platform mounted to the chassis and moveable between a raised position and a lowered position with respect to the chassis, the stability system comprising:

a first body mounted to the chassis and configured to extend at least partially between the first ground engaging structure and the second ground engaging structure;

wherein the first body is configured to be moveable relative to the chassis between a deployed position in which the first body enhances the stability of the lift vehicle if the lift vehicle is driven into a depression when the platform is in the raised position, and a stowed position when the platform is in the lowered position; and wherein when the first body is in the deployed position, the stability system is arranged to produce an output indicating that a force having at least an upward component has been exerted on the first body.

2. The stability system according to claim 1, wherein the output is configured to produce an indication to an operator that the force has been exerted on the first body.

3. The stability system according to claim 1, wherein the force is transmitted substantially upwards through the first body.

4. The stability system according to claim 1, wherein the output is configured to at least partially interrupt a transmission of drive to the ground engaging structure so as to stop or cut-out travelling of the lift vehicle along a ground surface at least in a direction towards the depression, in response to the force being exerted on the first body.

5. The stability system according to claim 4, further comprising an override mechanism, wherein the override mechanism is configured to prevent or override the output from stopping or cutting out travelling of the lift vehicle along the ground surface in at least one direction in response to the force being exerted on the first body.

6. The stability system according to claim 1, further comprising a detection device mounted to the chassis proximate to the first body or on the first body, wherein the detection device is configured to produce the output.

7. The stability system according to claim 1, further comprising a controller configured to automatically stop or control travelling of the lift vehicle along a ground surface at least in a direction towards the depression based on the output, and/or configured to indicate to an operator to stop or prevent travelling of the lift vehicle along a ground surface based on the output.

8. The stability system according to claim 7, further comprising a device in communication with the controller, wherein the device is configured to indicate to the operator to stop or prevent travelling of the lift vehicle along the ground surface and/or configured to indicate to the operator that the controller has stopped or prevented travelling of the lift vehicle along the ground surface.

9. The stability system according to claim 1, wherein the first body is configured to be moveable relative to the chassis of the lift vehicle in an upward direction, and wherein the first body is configured to move upon the force being exerted on the first body.

10. The stability system according to claim 9, wherein the movement of the first body in response to the force being exerted on the first body causes a detection device to produce an output.

11. The stability system according to claim 10, wherein the detection device is a position sensor, and wherein movement of the first body within a predetermined distance of the position sensor causes the position sensor to produce the output.

12. The stability system according to claim 1, further comprising a deployment detection system, wherein the deployment detection system is configured to detect when the first body is in the deployed position, and/or when the first body is not in the deployed position.

13. The stability system according to claim 12, wherein the deployment detection system includes a second detection device, and wherein the second detection device is configured to produce an output indicative that the detection device is not in the deployed position.

14. The stability system according to claim 1, wherein the first body is configured to be rotatable relative to the chassis, and wherein the first body is configured to rotate so as to move between the deployed position and the stowed position.

15. The stability system according to claim 1, wherein the first body is mounted to the chassis by a mounting arrangement.

16. The stability system according to claim 15, wherein the mounting arrangement includes at least one elongate slot configured to facilitate relative movement between the first body and the chassis, and wherein the first body is moved towards an uppermost end of the elongate slot when the force is exerted on the first body.

17. The stability system according to claim 15, wherein the mounting arrangement comprises an actuation mechanism configured to move the first body between the stowed position and the deployed position.

18. The stability system according to claim 1, wherein the first body is a beam or a plate configured to extend at least partially between the first ground engaging structure and the second ground engaging structure.

19. The stability system according to claim 1, wherein the first body incudes a substantially linear lowermost surface, and wherein the force is exerted on the lowermost surface of the first body.

20. A lift vehicle comprising:

a chassis;

a first ground engaging structure proximate a first end of the chassis and a second ground engaging structure proximate a second end of the chassis;

wherein the chassis is supported by the first and second ground engaging structures;

wherein the chassis comprises a propulsion system for moving the lift vehicle via the first and second ground engaging structures;

a platform mounted to the chassis and moveable between a raised position and a lowered position with respect to the chassis; and a stability system for inhibiting tipping of the lift vehicle, the stability system comprising:

a first body mounted to the chassis and configured to extend at least partially between the first ground engaging structure and the second ground engaging structure;

wherein the first body is configured to be moveable relative to the chassis between a deployed position in which the first body enhances the stability of the lift vehicle if the lift vehicle is driven into a depression when the platform is in the raised position, and a stowed position when the platform is in the lowered position; and wherein when the first body is in the deployed position, the stability system is arranged to produce an output indicating that a force having at least an upward component has been exerted on the first body.

* * * * *